United States Patent
Smith

(10) Patent No.: US 9,776,469 B1
(45) Date of Patent: Oct. 3, 2017

(54) ENGINE START-UP METHOD FOR HYBRID VEHICLE

(71) Applicant: FORD GLOBAL TECHNOLOGIES, LLC, Dearborn, MI (US)

(72) Inventor: Mark G. Smith, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/091,117

(22) Filed: Apr. 5, 2016

(51) Int. Cl.
| | |
|---|---|
| B60H 1/00 | (2006.01) |
| B60W 10/06 | (2006.01) |
| B60W 10/30 | (2006.01) |
| B60W 20/00 | (2016.01) |
| B60W 20/40 | (2016.01) |
| B60W 20/15 | (2016.01) |
| B60K 6/24 | (2007.10) |
| B60H 1/04 | (2006.01) |

(52) U.S. Cl.
CPC ......... B60H 1/004 (2013.01); B60H 1/00764 (2013.01); B60H 1/00828 (2013.01); B60H 1/00871 (2013.01); B60H 1/04 (2013.01); B60K 6/24 (2013.01); B60W 10/06 (2013.01); B60W 10/30 (2013.01); B60W 20/15 (2016.01); B60W 20/40 (2013.01); *B60L 2240/34* (2013.01); *B60L 2240/36* (2013.01); *B60W 2510/06* (2013.01); *B60W 2710/06* (2013.01); *B60Y 2300/43* (2013.01); *B60Y 2306/07* (2013.01); *Y10S 903/905* (2013.01)

(58) Field of Classification Search
CPC ...... B60H 1/004; B60H 1/04; B60H 1/00764; B60H 1/00871; B60H 1/00828; B60W 10/06; B60W 10/30; B60W 20/40; B60W 20/15; B60W 2710/06; B60K 6/24; Y10S 903/905; B60Y 2300/43; B60Y 2306/07; B60L 2240/34; B60L 2240/36
See application file for complete search history.

(56) References Cited

U.S. PATENT DOCUMENTS

| | | | |
|---|---|---|---|
| 4,608,914 A | 9/1986 | Shimada et al. | |
| 8,561,915 B2 | 10/2013 | Ishida et al. | |
| 2002/0104324 A1* | 8/2002 | Homan .............. | B60H 1/00735 62/176.2 |
| 2007/0299560 A1 | 12/2007 | LaHue et al. | |
| 2011/0288701 A1* | 11/2011 | Chen ..................... | B60W 10/06 701/22 |
| 2013/0020398 A1* | 1/2013 | Goto .................. | B60H 1/00285 237/12.4 |
| 2014/0032086 A1* | 1/2014 | Wijaya ................ | F02N 11/0837 701/112 |
| 2014/0110489 A1* | 4/2014 | Yasui ................. | B60H 1/00285 237/5 |
| 2014/0261308 A1* | 9/2014 | Miyagawa ............. | F02B 77/11 123/320 |

* cited by examiner

*Primary Examiner* — Michael J Zanelli
(74) *Attorney, Agent, or Firm* — David Kelley; Brooks Kushman P.C.

(57) ABSTRACT

A vehicle includes an engine, a climate control system, a cabin, and a controller. The controller is programmed to, in response to the climate control system supplying heat to a vehicle cabin and receiving a request for an economy mode, decrease an engine coolant temperature engine start threshold. The controller is further programmed to, in response to the engine coolant temperature becoming less than the threshold, start the engine.

17 Claims, 2 Drawing Sheets

ENGINE START-UP METHOD FOR HYBRID VEHICLE

TECHNICAL FIELD

The present disclosure relates to an engine start-up method for a hybrid vehicle.

BACKGROUND

Hybrid vehicles may include both an internal combustion engine and an electric motor that each provides power to propel the vehicle. The internal combustion engine may be shut down periodically, under certain circumstances, while the electric motor alone provides power in order to increase fuel economy. This may be referred to as an electric only mode or an EV mode. When the electric motor alone is incapable of providing the required power output, the internal combustion engine is started.

SUMMARY

A vehicle includes an engine, a climate control system, a cabin, and a controller. The controller is programmed to, in response to the climate control system supplying heat to a vehicle cabin and receiving a request for an economy mode, decrease an engine coolant temperature engine start threshold. The controller is further programmed to, in response to the engine coolant temperature becoming less than the threshold, start the engine.

A vehicle controller includes, input channels, a first output channel, and control logic. The input channels are configured to receive signals indicative of a request for cabin heating, a request for an economy mode, and an engine coolant temperature. The first output channel is configured to provide a command to start an engine. The control logic is programmed to, in response to the requests for cabin heating and the economy mode, generate the command to start the engine when the engine coolant temperature becomes less than a first threshold. The control logic is further programmed to, in response to the request for cabin heating and an absence of the request for the economy mode, generate the command to start the engine when the engine coolant temperature becomes less than a second threshold, wherein the second threshold is greater than the first threshold.

An engine starting method includes, in response to a climate control system supplying heat to a cabin and receiving a request for an economy mode, starting the engine when the engine coolant temperature becomes less than a first threshold; and in response to an absence of the request for an economy mode, starting the engine when the engine coolant temperature becomes less than a second threshold that is greater than the first threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
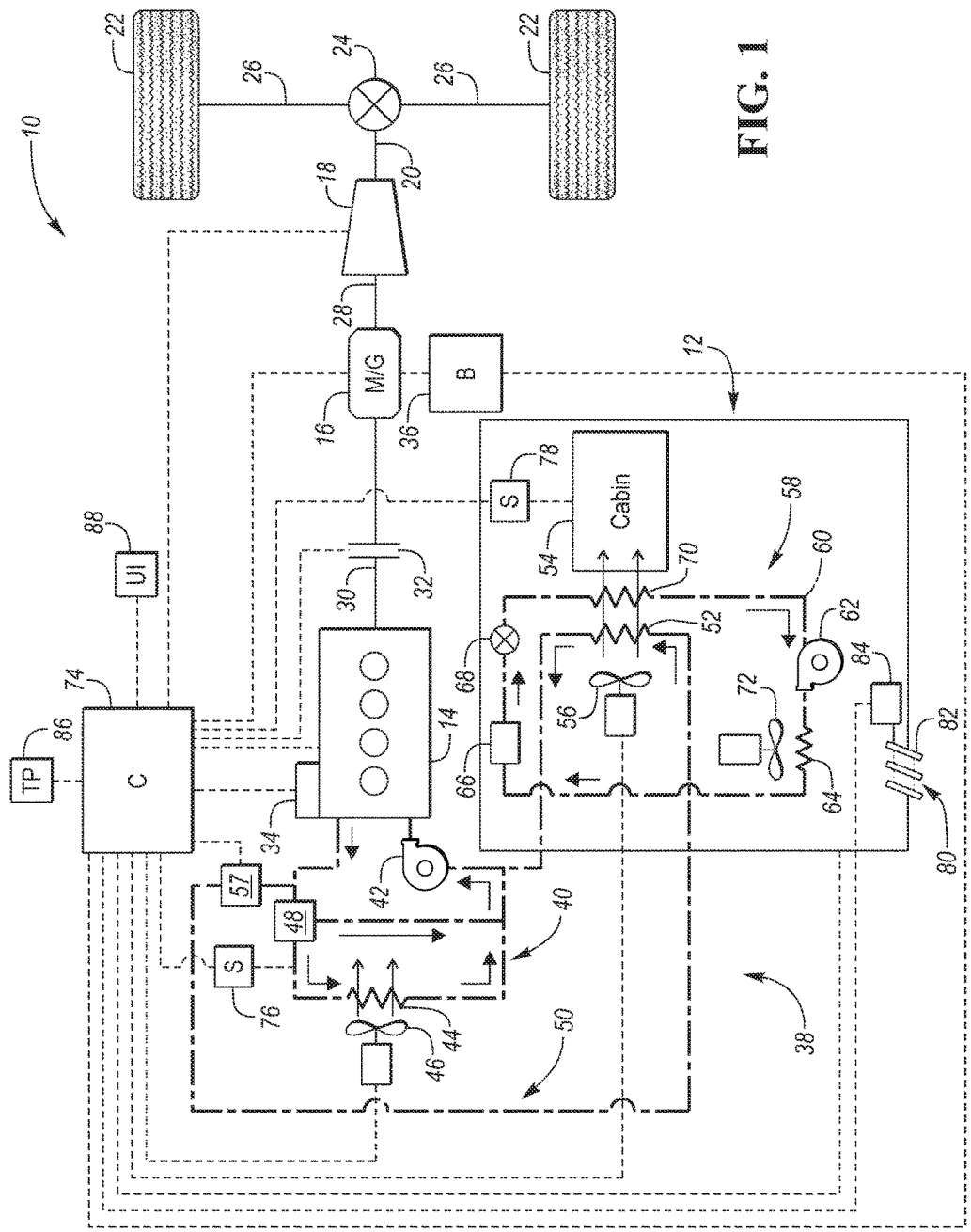
FIG. 1 is a schematic diagram of a hybrid vehicle having a climate control system.

Referring to FIG. 1, a schematic representative of a hybrid vehicle 10 having a climate control system 12 is illustrated. The vehicle 10 includes a powertrain that has an internal combustion engine 14 and an electric machine 16. The engine 14 and the electric machine 16 may both generate power to propel the vehicle 10. The electric machine 16 may be a motor or a combination motor/generator. The powertrain may also include a transmission 18. The transmission 18 may include a series of selectable gears and clutches that provide multiple gear ratios between the input and the output of the transmission. The transmission 18 may be a manual or automatic transmission. The transmission may also include a torque converter that may include a locking clutch. The powertrain may further include a series of shafts that connect the various elements. For example, the transmission 18 may include an output shaft 20 that connects to the drive wheels 22 of the vehicle 10 via a differential 24 and a series of half shafts 26. The electrical machine 16 may be disposed on an input shaft 28 of the transmission 18. The input shaft 28 may be selectively coupled to a crankshaft 30 of the engine 14 by an engine disconnect clutch 32. The powertrain may also include other clutches to decouple or couple various elements. A starter motor 34 may be used to start the engine 14 or the electrical machine 16 may be used to start the engine 14 by closing the disconnect clutch 32. A traction battery 36 may provide electrical power to operate the electric machine 16. The electric machine 16 may in turn recharge the battery when receiving power from the engine 14 or through regenerative braking (when being operated as a generator).

The engine 14 may include a cooling system 38 that utilizes a liquid coolant to remove heat from the engine 14. The cooling system 38 may include a first loop 40 that includes a pump 42 and a first heat exchanger (such as a radiator) 44 to remove excess heat from the coolant. A fan 46 may be used to direct air across the first heat exchanger 44 in order to increase the heat transfer from the liquid coolant within the first loop 40 to the ambient air. The fan 46 may include an electric motor that provides power to rotate the blades of the fan 46. The first loop 40 may also include a thermostat 48 that is configured to bypass the first heat exchanger 44 and redirect coolant back into the engine 14 when it is desired to increase the temperature of the coolant.

The cooling system 38 may also include a second loop 50 that is configured to direct coolant to a second heat exchanger 52 that is part of the climate control system 12. The second heat exchanger 52 may be a heater core that transfers heat from the coolant to air that is being directed into a cabin 54 of the vehicle 10. The climate control system 12 may include a blower 56 that is configured to direct air across the second heat exchanger 52 in order to heat the air entering the cabin 54, when the vehicle operator has activated the climate control system 12 to heat the cabin 54. The blower 56 may include an electric motor that provides power to rotate the blades of the blower 56. The second cooling loop 50 may include a valve 57 that opens to allow heated coolant to flow through the second cooling loop 50 when the vehicle operator has activated the climate control system 12 to heat cabin 54. The valve 57 may be configured to close when the vehicle operator has not activated the climate control system 12 to heat cabin 54.

The climate control system 12 may also include an air-conditioning system 58. The air-conditioning system may include a refrigerant loop, 60, a compressor 62, a condenser 64, a receiver/dryer 66, an expansion valve 68, and an evaporator 70. The blower 56 may be configured to direct air across the evaporator 70 in order to cool the air entering the cabin 54, when the vehicle operator has activated the climate control system 12 to cool the cabin 54. The speed of the blower 56 (whether heating or cooling) may be a function of the temperature of the ambient air, a heat load value, cabin temperature, etc. and may range between a maximum output speed and zero depending on these factors. The selection of an economy mode (discussed below) may or may not change the blower speed based the temperature of the ambient air, a heat load value, cabin temperature, etc. The climate control system 12 may also include a second fan 72 that is configured to direct air across the condenser 64 in order to reject excess heat from the refrigerant in the refrigerant loop 60 to the ambient air. Alternatively, the fan 46 that directs air across the first heat exchanger 44 may also be used to direct air across the condenser 64 as opposed to using a second fan 72. The second fan 72 may include an electric motor that provides power to rotate the blades of the second fan 72.

The vehicle 10 may also include a controller 74 is configured to send command signals via output channels to various components of the vehicle 10. The controller 74 is also configured to receive sensory feedback information or input signals via input channels from various components of the vehicle 10. A single dotted line between the controller 74 and another component of the vehicle 10 may be representative of both an input channel and an output channel. The controller may include control logic that is configured to generate various command signals in response to various input signals. The command signals and input signals may be transmitted and received as electrical signals. The controller 74 may communicate with various components of the vehicle 10 via input and output channels including, but not limited to, the climate control system 12, engine 14, electric machine 16, transmission 18, engine disconnect clutch 32, traction battery 36, pump 42, fan 46, thermostat 48, blower 56, valve 57, air-conditioning system 58 (including the compressor 62, expansion valve 68, and second fan 72). The cooling system 38 of the engine may include a coolant temperature sensor 76 that communicates the current engine coolant temperature to the controller 74. The cabin 54 may include a sensor 78 that communicates the current climate conditions (cabin air temperature, humidity, etc.) to the controller 74.

The climate control system 12 may include a ram air inlet 80 that directs ram air across either the second heat exchanger 52 or the evaporator 70 to either heat or cool, ram air entering into the cabin 54, when the operator has activated the climate control system 12, to heat or cool the cabin 54. Ram air may directed across either the second heat exchanger 52 or the evaporator 70 and into the cabin 54 when the vehicle is moving and a pressure differential is produced between the air surrounding the vehicle and the air in the vehicle cabin 54. The ram air inlet may include a door or a set of louvers 82 that only allows ram air to flow across either the second heat exchanger 52 or the evaporator 70 and into the cabin 54 when the door or louvers 82 are in an open position. Ram air may be prevented from flowing across either the second heat exchanger 52 or the evaporator 70 and into the cabin 54 when the door or louvers 82 are in a closed position. The door or louvers 82 may remain in the closed position when a recirculating mode is selected. The door or louvers 82 may be connected to an actuator 84 that transitions the door or louvers 82 between the opened and closed positions. The actuator 84 may be in communication with the controller 74 via input and output channels and may be configured to open and close based on commands received from the controller 74.

The vehicle 10 may also include heated touch points 86 that may be activated in order to increase user comfort levels. The heated touch points 86 may include, but are not limited to, the steering wheel, arm rest, center console, gear shifter, seat bottom, and seat back. The heated touch points 86 may be activated manually by the operator through a user interface 88 or automatically in response to command signals from the controller 74 that are generated in response to a set of vehicle conditions. The heated touch points 86 and the user interface 88 may both be in communication with the controller 74 via input channels and output channels.

The user interface 88 may include a touchscreen, a series of buttons, a series of dials or knobs, etc. that are configured to allow the vehicle operator to control various systems within the vehicle 10. The user interface 88 may include user controls for the climate control system 12 that allow the vehicle operator to select between heating and cooling of the cabin 54. The user controls may also include selecting the desired amount of heating and cooling for the cabin 54. The user interface 88 may also include user controls that communicate with the controller 74 to allow the vehicle operator to select an economy mode that prioritizes fuel economy over the selected comfort level (i.e., heating and cooling) of the vehicle cabin 54. The economy mode may be selected to operate automatically during key operating cycles of the vehicle 10. For example the economy mode may activate automatically during a predicted commute that is expected to occur during certain days of the week and/or during specific time periods of the day (e.g., the morning and evening commutes to and from work occurring Monday through Friday). Alternatively, the economy mode may be configured to activate during time periods that have been preselected by the vehicle operator. The preselected time periods may correspond to certain days of the week and/or during specific times of the day. The economy mode may be configured to activate during subsequent periods that correspond to the preselected time periods, even after the vehicle has been turn off, unless the vehicle operator changes or deletes the preselected time period. This may be referred to as latching.

While illustrated as one controller, the controller 74 may be part of a larger control system and may control or may be controlled by various other controllers throughout the vehicle 10. It should therefore be understood that the controller 74 and one or more other controllers can collectively be referred to as a "controller" that controls various actuators in response to signals from various sensors to control functions such as starting/stopping the engine 14, operating the electric machine 16 to provide wheel torque or charge the traction battery 36, etc. The controller 74 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 74 in controlling various components of the vehicle 10.

Figure 2:
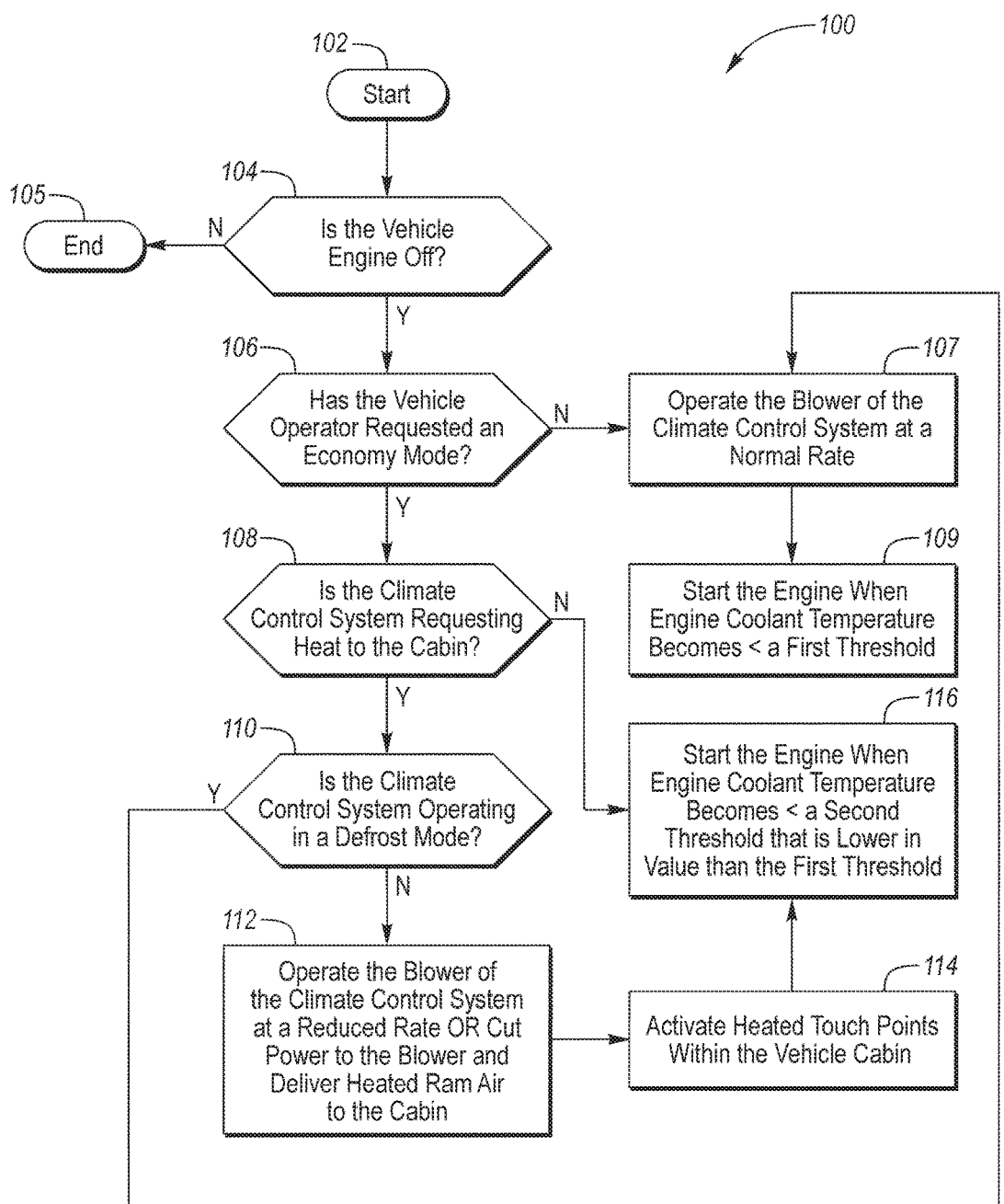
FIG. 2 is a flowchart illustrating an engine start-up method for the hybrid vehicle.

Referring to FIG. 2, a flowchart representative of an engine start-up method 100 is illustrated. The method 100 may be stored in the form of control logic and/or algorithms within the memory of the vehicle controller 74. The controller 74 may generate command signals to implement and execute the method 100 based on the control logic and/or algorithms. The command signals may be generated based on the control logic and/or algorithms and in response to input signals (including user inputs and various vehicle conditions transmitted to the controller 74 via sensing devices) received by the controller 74.

The method 100 is initiated at start block 102. Next, after the method 100 has been initiated the method 100 moves on to block 104 where it is determined whether or not the engine 14 is off. If the engine 14 is running and is not turned off, the method 100 ends at block 105. If it is determined that the engine 14 is turned off, the method 100 moves on to block 106 where is determined whether or not the vehicle operator has selected an economy mode that prioritizes fuel economy over the selected comfort level (i.e., heating and cooling) of the vehicle cabin 54.

If the vehicle operator has not selected the economy mode at block 106, the method 100 moves on to block 107, where the blower 56 of the climate control system 12 will be commanded to operate at a normal, standard, or desired rate (i.e., the normal operating rate at which the blower delivers heated air into the vehicle cabin 54 to obtain the vehicle operator's selected desired comfort level) if the vehicle operator selected to heat the vehicle cabin 54. Next, the method 100 will move on to block 109 where the engine 14 will be commanded to start once the engine coolant temperature becomes less than a first threshold. The first threshold may have an approximate value of anywhere between 50° C. and 70° C. Also, there may be hysteresis value added to the first threshold to prevent the engine 14 from turning on and off at an undesired frequency. The hysteresis value may be added to the first threshold while the engine coolant temperature is either increasing or decreasing. If the vehicle operator has not selected to heat the vehicle cabin 54 after it has been determined that the vehicle operator has not selected the economy mode at block 106, the blower 56 may be shut off and the threshold of the engine coolant temperature at which the engine 14 is commanded to start may be decreased to a lower value. The lower value of the threshold of the engine coolant temperature at which the engine 14 is commanded to start (when the vehicle operator has not selected to heat the vehicle cabin 54 after it has been determined that the vehicle operator has not selected the economy mode) may correspond to the threshold engine coolant temperature at which the engine is commanded to start that is discussed in block 116 below.

If the vehicle operator has selected the economy mode at block 106, the method 100 moves on to block 108, where it is determined whether or not the climate control system 12 is requesting that heat be supplied to the cabin 54. If the climate control system 12 is requesting that heat be supplied to the cabin 54, the method 100 moves on to block 110 where it is determined whether or not the climate control system 12 is operating in or requesting a defrost mode. If the climate control system 12 is operating in a defrost mode, the method moves on to blocks 107 and 109, where the blower 56 is operated at the normal rate and the engine is commanded to start once the engine coolant temperature becomes less than the first threshold, respectively.

If it is determined that the climate control system 12 is not in a defrost mode at block 110, the method 100 moves on to block 112 where either the blower 56 of the climate control system 12 will be commanded to operate at a reduced rate (i.e., a rate that is less than the normal operating rate at which the blower delivers heated air into the vehicle cabin 54 to obtain the vehicle operator's desired comfort level) or power to the blower 56 will be cut and ram air will be heated via the second heat exchanger 52 and delivered into the vehicle cabin 54. Choosing between commanding the blower 56 of the climate control system 12 to operate at a reduced rate and cutting power to the blower and delivering heated ram air to the cabin 54 may be a selectable option, via the user interface 88 or other switch, when the vehicle operator selects the economy mode. Next, the method 100 will move on to block 114 where the heated touch points 86 within the vehicle cabin 54 may be activated. Block 114 may be an optional step depending on whether or not the vehicle 10 includes heated touch points 86 or whether or not the vehicle operator has requested that the heated touch points 86 activate when in the economy mode. After block 114, the method will move on to block 116 where the engine 14 will be commanded to start once the engine coolant temperature becomes less than a second threshold that is less than the first threshold. The second threshold may have an approximate value of anywhere between 30° C. and 50° C. Also, there may be hysteresis value added to the second threshold to prevent the engine 14 from turning on and off at an undesired frequency. The hysteresis value may be added to the second threshold while the engine coolant temperature is either increasing or decreasing. Once the engine 14 is started, the blower 56 may be commanded to operate at the normal rate and touch points may be deactivated. Alternatively, after the engine 14 is started, the blower may remain operating at the reduced rate and the touch points may remain activated.

Returning to block 108, if it is determined that the climate control system 12 is not requesting that heat be supplied to the cabin 54, the method 100 moves directly onto block 116, where the engine 14 will be commanded to start once the engine coolant temperature becomes less than the second threshold.

If at any time during the operation of the method 100 the defrost mode is selected or requested, the blower 56 of the climate control system 12 may be commanded to operate at the normal rate according to block 107 (which may include eliminating delivering ram air to the vehicle cabin 54) and the engine may be commanded to start when the engine coolant temperature becomes less than the first threshold according to block 109. Also, if at any time during the operation of the method 100, the economy mode is terminated, the blower 56 of the climate control system 12 may be commanded to operate at the normal rate according to block 107 (which may include eliminating delivering ram air the vehicle cabin 54) and the engine may be commanded to start when the engine coolant temperature becomes less than the first threshold according to block 109.

There may also be an engine shut-down or engine stop coolant temperature threshold that corresponds to a temperature that the engine coolant must increase to before the engine is turned off while the climate control system 12 is requesting that heat be supplied to the cabin 54. The engine shut-down coolant temperature threshold may be set to maintain an incremental value (e.g., a hysteresis band which may remain constant) that is higher than the engine coolant temperature values that trigger an engine-start up. For example, when the economy mode is selected and the conditions are such, according to the method 100 (with the exception of the engine being off at block 104), that the engine coolant temperature threshold that corresponds to triggering an engine start would decrease from the first threshold (see block 109) to the second threshold (see block 116), the engine shut-down coolant temperature threshold may decrease by the same amount. Additionally, if the economy mode is deselected or if the economy mode is selected and the conditions are such, according to the method 100 (with the exception of the engine being off at block 104), that the engine coolant temperature threshold that corresponds to triggering an engine start would increase from the second threshold (see block 116) to the first threshold (see block 109), the engine shut-down coolant temperature threshold may increase by the same amount.

It should be understood that the flowchart illustrating the engine start-up method 100 is meant for illustrative purposes. Some of the steps may be rearranged while other steps may be omitted entirely.

It should be understood that the hybrid vehicle configuration described herein is merely exemplary and is not intended to be limited. Other hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), or any other hybrid vehicle configuration known to a person of ordinary skill in the art.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    an engine;
    a climate control system having a blower; and
    a controller programmed to,
        in response to the climate control system supplying heat to a cabin via the blower and receiving a request for an economy mode, decrease an engine coolant temperature engine start threshold, cut blower power, and channel heated ram air into the cabin, and
        in response to the engine coolant temperature becoming less than the threshold, start the engine.

2. The vehicle of claim 1, wherein the controller is further programmed to, in response to the climate control system supplying heat to the cabin and receiving a request to terminate the economy mode, increase the engine coolant temperature engine start threshold.

3. The vehicle of claim 1, wherein the climate control system includes a blower that is configured to pump heated air into the cabin, and wherein the controller is further programmed to reduce a rate at which the blower delivers heated air into the cabin in response to the climate control system supplying heat to the cabin and receiving the request for an economy mode.

4. The vehicle of claim 3, wherein the controller is further programmed to, in response to the climate control system operating in a defrost mode, override decreasing the engine coolant temperature engine start threshold.

5. The vehicle of claim 3, wherein the controller is further programmed to, in response to the climate control system operating in a defrost mode, override reducing the rate at which the blower delivers heated air into the cabin.

6. The vehicle of claim 1, wherein the controller is further programmed to:
    in response to the climate control system supplying heat to the cabin and receiving the request for an economy mode, decrease an engine coolant temperature engine stop threshold, and
    in response to the engine coolant temperature becoming greater than the engine coolant temperature engine stop threshold, stop the engine.

7. The vehicle of claim 1, wherein the controller is further programmed to, in response to the climate control system operating in a defrost mode, override cutting power to the blower and channeling heated ram air into the cabin.

8. A vehicle controller comprising:
    input channels configured to receive signals indicative of a request for cabin heating, a request for an economy mode, and an engine coolant temperature;
    a first output channel configured to provide a command to start an engine;
    a second output channel configured to provide a command to operate a blower to heat a cabin; and
    control logic programmed to,
        in response to the requests for cabin heating and the economy mode, generate the command to start the engine when the engine coolant temperature becomes less than a first threshold, generate the command to cut power to the blower, and channel heated ram air into the cabin, and
        in response to the request for cabin heating and an absence of the request for the economy mode, generate the command to start the engine when the engine coolant temperature becomes less than a second threshold, wherein the second threshold is greater than the first threshold.

9. The controller of claim 8, further comprising a second output channel configured to provide a command to operate a blower to pump heated air into a cabin, and wherein the control logic is further programmed to, in response to the requests for cabin heating and the economy mode, generate the command to operate the blower to deliver heated air into the cabin at a reduced rate that is less than a desired rate.

10. The controller of claim 9, wherein the control logic is further programmed to, in response to the request for cabin heating and the absence of the request for the economy mode, generate the command to operate the blower to deliver heated air into the cabin at the desired rate.

11. The controller of claim 10, wherein the control logic is further programmed to, in response to the request for cabin heating, the request for the economy mode, and a defrost request, generate the command to operate the blower to deliver heated air into the cabin at the desired rate.

12. The controller of claim 8, wherein the control logic is further programmed to, in response to the request for cabin heating, the request for the economy mode, and a defrost request, generate the command to start the engine when the engine coolant temperature becomes less than the second threshold.

13. An engine starting method comprising:
   in response to a climate control system supplying heat to a cabin and receiving a request for an economy mode, starting an engine when the engine coolant temperature becomes less than a first threshold, powering off a blower of the climate control system that delivers heated air into the cabin, and channeling heated ram air into the cabin; and
   in response to an absence of the request for an economy mode, starting the engine when the engine coolant temperature becomes less than a second threshold that is greater than the first threshold.

14. The method of claim 13, further comprising:
   in response to the climate control system supplying heat to the cabin and receiving the request for an economy mode, reducing a rate at which the blower of the climate control system delivers heated air into the cabin.

15. The method of claim 13, further comprising:
   in response to the climate control system supplying heat to the cabin, receiving the request for an economy mode, and the climate control system operating in a defrost mode, starting the engine when the engine coolant temperature becomes less than the second threshold.

16. The method of claim 13, further comprising:
   in response to the climate control system supplying heat to the cabin and receiving the request for an economy mode, activating heated touch points within the cabin.

17. The method of claim 13, further comprising:
   in response to the climate control system supplying heat to the cabin, receiving the request for an economy mode, and the climate control system operating in a defrost mode, starting the engine when the engine coolant temperature becomes less than the second threshold and powering on the blower.

\* \* \* \* \*